(12) United States Patent
Banerjee et al.

(10) Patent No.: US 12,530,063 B2
(45) Date of Patent: Jan. 20, 2026

(54) DYNAMIC PARTITIONING A POWER BUDGET AMONG COMPUTE AGENTS OF A SYSTEM ON CHIP (SoC)

(71) Applicant: Apple Inc., Cupertino, CA (US)

(72) Inventors: Ronit Banerjee, Mountain View, CA (US); Apoorv Gupta, Hayward, CA (US); Jason P. Jane, Morgan Hill, CA (US); Bryan R. Hinch, Campbell, CA (US); Andrei Dorofeev, Los Gatos, CA (US); John G. Dorsey, San Francisco, CA (US); Karthic A. Palaniappan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 18/415,035

(22) Filed: Jan. 17, 2024

(65) Prior Publication Data

US 2025/0231599 A1 Jul. 17, 2025

(51) Int. Cl.
| | |
|---|---|
| G06F 1/20 | (2006.01) |
| G06F 1/26 | (2006.01) |
| G06F 1/28 | (2006.01) |
| G06F 1/3228 | (2019.01) |
| G06F 9/50 | (2006.01) |
| G06F 11/30 | (2006.01) |
| G06F 11/34 | (2006.01) |

(52) U.S. Cl.
CPC ............... G06F 1/206 (2013.01); G06F 1/26 (2013.01); *G06F 1/28* (2013.01); *G06F 1/3228* (2013.01); *G06F 9/5094* (2013.01); *G06F 11/3058* (2013.01); *G06F 11/3409* (2013.01)

(58) Field of Classification Search
CPC ... G06F 1/26; G06F 1/28; G06F 1/206; G06F 9/5094; G06F 1/3228; G06F 11/3409; G06F 11/3058
USPC .................................. 713/300, 340; 718/100
See application file for complete search history.

(56) References Cited

U.S. PATENT DOCUMENTS

| | | |
|---|---|---|
| 8,374,730 B2 | 2/2013 | Conroy et al. |
| 9,494,994 B1 | 11/2016 | Law et al. |
| 11,513,576 B2 | 11/2022 | Zahir et al. |
| 11,579,934 B2 | 2/2023 | Andrus et al. |
| 11,809,256 B2 | 11/2023 | Ismail et al. |
| 2015/0185814 A1* | 7/2015 | Ping ........................ G06F 1/206 713/323 |
| 2017/0054658 A1* | 2/2017 | Min .......................... G06F 9/54 |

(Continued)

*Primary Examiner* — Ji H Bae
(74) *Attorney, Agent, or Firm* — Sterne, Kessler, Goldstein & Fox P.L.L.C.

(57) ABSTRACT

Systems, methods, and apparatuses disclosed herein can advantageously leverage a power budget to manage heat. These systems, methods, and apparatuses can dynamically distribute the power budget to manage the heat. As part of this dynamic distribution, these systems, methods, and apparatuses can monitor their operation. In some embodiments, when this monitoring indicates that workloads are being created faster than being performed, these systems, methods, and apparatuses can be distributed more of the power budget to optimize the efficiency in performing these workloads. On the other hand, these systems, methods, and apparatuses can be distributed less of the power budget to optimize the efficiency in creating these workloads when this monitoring indicates workloads are being performed faster than being created.

20 Claims, 8 Drawing Sheets

(56) References Cited

U.S. PATENT DOCUMENTS

| | | | |
|---|---|---|---|
| 2018/0232032 A1* | 8/2018 | Wang | G06F 1/3234 |
| 2021/0216377 A1* | 7/2021 | Arlagadda Narasimharaju | G06F 1/3287 |
| 2021/0365095 A1* | 11/2021 | Han | G06F 1/3206 |

* cited by examiner

DYNAMIC PARTITIONING A POWER BUDGET AMONG COMPUTE AGENTS OF A SYSTEM ON CHIP (SoC)

BACKGROUND

It can be advantageous for a computing device to implement a thermal solution, also referred to as a cooling system or a heat dissipation solution, to manage heat generated during its operation. As electric current flows through the computing device, some of this current can be converted from electrical energy into thermal energy, simply referred to as heat. The thermal solution manages the heat generated by the computing device to prevent the computing device from suffering irreparable thermal damage. For example, the thermal solution can supplement the computing device with various heatsinks, fans, cooling systems, heat pipes, graphite sheets, and/or vapor chamber cooling systems, among others, to manage the heat generated by the computing device. However, in some situations, the thermal solution can have trouble managing the heat generated by the computing device when the computing device is operating under a heavy workload, such as video rendering, scientific simulations, and/or database queries, among others, to provide some examples. For example, the heavy workload can be considered when computational resources, memory, and/or processing power, among others, of the computing device approach, or exceed, eighty percent, ninety percent, or even close to one-hundred percent of their maximum capabilities. In this example, the heavy workload suggests that a significant portion of the computational resources, memory, and/or processing power, among others, of the computing device are actively engaged performing the heavy workload. Often times, the heat generated by the computing device, when operating under the heavy workload, can increase beyond that which is capable of being managed by the thermal solution. In these situations, the computing device can conventionally constrain computational resources, memory, and/or processing power, among others, of the computing device to manage the heat generated by the computing device. This conventional constraining of the computational resources, the memory, and/or the processing power, among others, of the computing device can be referred to as a constrained workload performance.

SUMMARY OF DISCLOSURE

Some embodiments of this disclosure describe a method for distributing a system power budget among compute agents of a computing device. The method can include accessing the system power budget, the system power budget being related to a temperature within the computing device, accessing performance metrics provided by consumer compute agents from among compute agents, partitioning the system power budget among consumer compute agents in response to performance metrics to provide component power budgets, and distributing component power budgets among consumer compute agents to distribute the system power budget among consumer compute agents.

In these embodiments, the method can further include receiving the system power budget from a system management controller that monitors a plurality of system component temperatures of the computing device.

In these embodiments, the performance metrics can be based on energy consumption of the plurality of consumer compute agents.

In these embodiments, the partitioning can include partitioning more of the system power budget to a power budget from among component power budgets when a corresponding performance metric from among performance metrics indicates that the producer compute agent is creating workloads faster than a corresponding consumer compute agent from among consumer compute agents is capable of performing the workloads.

In these embodiments, the partitioning can include partitioning less of the system power budget to a power budget from among component power budgets when a corresponding performance metric from among performance metrics indicates that the producer compute agent is creating workloads slower than a corresponding consumer compute agent from among consumer compute agents is capable of performing the workloads In these embodiments, the partitioning can include determining dynamic power coefficients in which to partition the system power budget among consumer compute agents, comparing a performance metric from among performance metrics and a corresponding dynamic power coefficient from among dynamic power coefficients determine a power coefficient margin that is associated with the corresponding dynamic power coefficient, and adjusting the corresponding dynamic power coefficient to minimize the power coefficient margin. In these embodiments, the adjusting can include increasing the corresponding dynamic power coefficient when the performance metric indicates a measured performance for a corresponding consumer compute agent from among consumer compute agents is more than a permitted performance allowed by the producer compute agent, and decreasing the corresponding dynamic power coefficient when the performance metric indicates a measured performance for a corresponding consumer compute agent from among consumer compute agents is less than a permitted performance allowed by the producer compute agent.

Some embodiments of this disclosure describe a System on Chip (SoC) having consumer compute agents from among the compute agents and a producer compute agent from among the compute agents. The consumer compute agents can provide performance metrics. The producer compute agent can access a system power budget that is related to a temperature within a computing device including the SoC, partition the system power budget among the compute agents in response to performance metrics to provide component power budgets, and distribute component power budgets among the compute agents to distribute the system power budget among the compute agents.

In these embodiments, the producer compute agent can receive the system power budget from a system management controller that monitors system component temperatures of the computing device.

In these embodiments, the performance metrics can be based on energy consumption of the consumer compute agents.

In these embodiments, the producer compute agent can partition more of the system power budget to a power budget from among the component power budgets when a corresponding performance metric from among the performance metrics indicates that the producer compute agent is creating workloads faster than a corresponding consumer compute agent from among the consumer compute agents is capable of performing the workloads.

In these embodiments, the producer compute agent can partition less of the system power budget to a power budget from among the component power budgets when a corresponding performance metric from among the performance metrics indicates that the producer compute agent is creating workloads slower than a corresponding consumer compute agent from among the consumer compute agents is capable of performing the workloads.

In these embodiments, the producer compute agent can determine dynamic power coefficients in which to partition the system power budget among consumer compute agents, compare a performance metric from among the performance metrics and a corresponding dynamic power coefficient from among the dynamic power coefficients determine a power coefficient margin that is associated with the corresponding dynamic power coefficient, and adjust the corresponding dynamic power coefficient to minimize the power coefficient margin. In these embodiments, the producer compute agent can increase the corresponding dynamic power coefficient when the performance metric indicates a measured performance for a corresponding consumer compute agent from among the consumer compute agents is more than a permitted performance allowed by the producer compute agent, and decrease the corresponding dynamic power coefficient when the performance metric indicates a measured performance for a corresponding consumer compute agent from among the consumer compute agents is less than a permitted performance allowed by the producer compute agent.

Some embodiments of this disclosure describe a computing device having a memory and a producer compute agent. The memory can store a producer compute agent closed-loop performance controller (CLPC). The producer compute agent can execute the producer CLPC. The producer CLPC, when executed by the producer compute agent, can configure the producer compute agent to access a system power budget that is related to a temperature within the computing device, access performance metrics provided by consumer compute agents, partition the system power budget among the compute agents in response to performance metrics to provide component power budgets, and distribute component power budgets among the compute agents to distribute the system power budget among the compute agents.

In these embodiments, the producer CLPC, when executed by the producer compute agent, can configure the producer compute agent to receive the system power budget from a system management controller that monitors system component temperatures of the computing device.

In these embodiments, the performance metrics can be based on energy consumption of consumer compute agents.

In these embodiments, the producer CLPC, when executed by the producer compute agent, can configure the producer compute agent to partition more of the system power budget to a power budget from among the component power budgets when a corresponding performance metric from among the performance metrics indicates that the producer compute agent is creating workloads faster than a corresponding consumer compute agent from among the consumer compute agents is capable of performing the workloads.

In these embodiments, the producer CLPC, when executed by the producer compute agent, can configure the producer compute agent to partition less of the system power budget to a power budget from among the component power budgets when a corresponding performance metric from among the performance metrics indicates that the producer compute agent is creating workloads slower than a corresponding consumer compute agent from among the consumer compute agents is capable of performing the workloads.

In these embodiments, the producer CLPC, when executed by the producer compute agent, can configure the producer compute agent to determine dynamic power coefficients in which to partition the system power budget among consumer compute agents, compare a performance metric from among the performance metrics and a corresponding dynamic power coefficient from among the dynamic power coefficients determine a power coefficient margin that is associated with the corresponding dynamic power coefficient, and adjust the corresponding dynamic power coefficient to minimize the power coefficient margin.

This Summary is provided merely for illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the disclosure and, together with the description, further serve to explain the principles of the disclosure and enable a person of skill in the relevant art(s) to make and use the disclosure.

Figure 1:
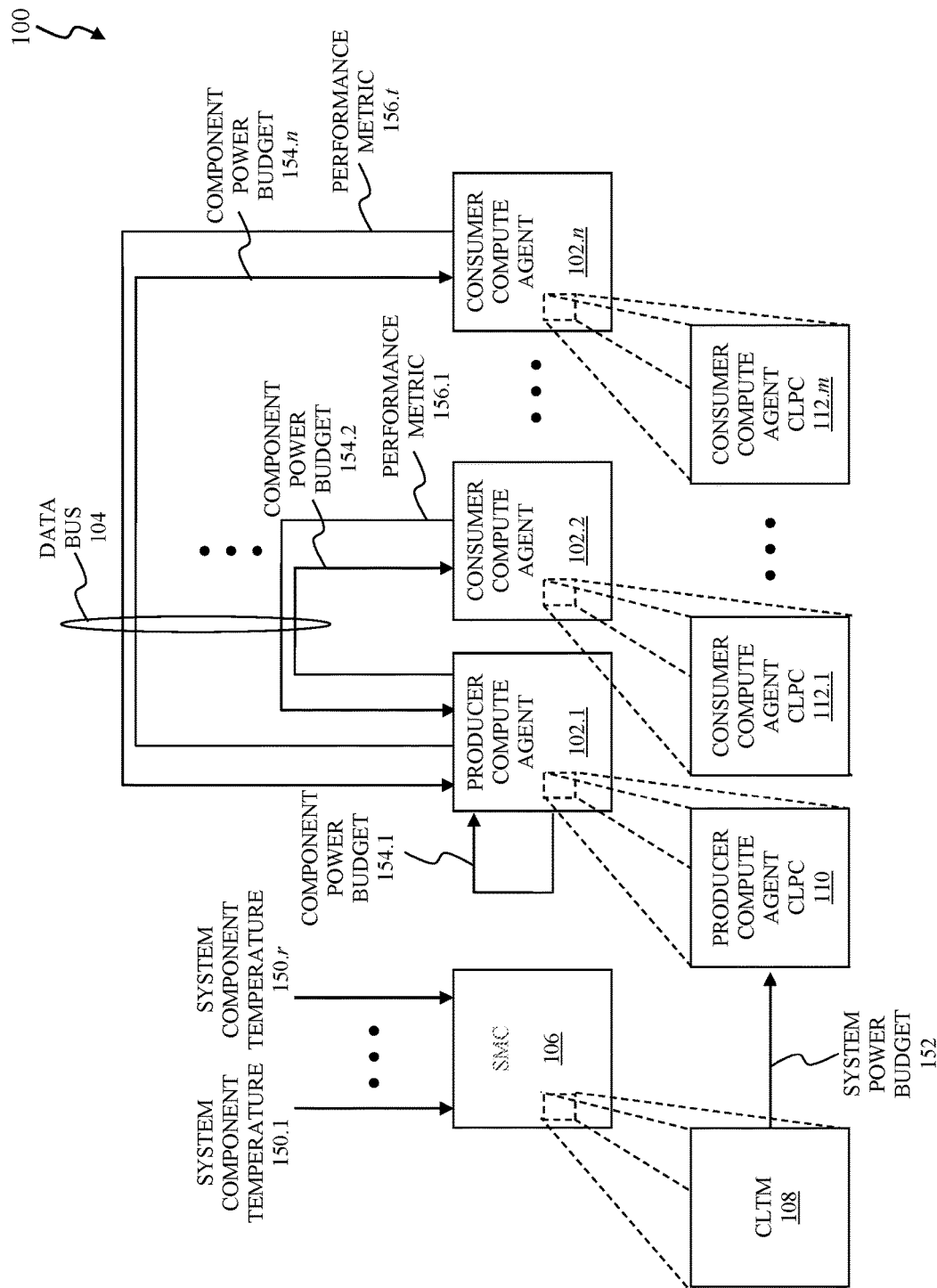
FIG. 1 graphically illustrates a first exemplary computing device in accordance with various embodiments of the present disclosure.

The disclosure is described with reference to the accompanying drawings. In the drawings, like reference numbers can indicate identical or functionally similar elements. Additionally, generally, the left-most digit(s) of a reference number identifies the drawing in which the reference number first appears.

DETAILED DESCRIPTION

Exemplary Workloads of Exemplary Computing Devices

Before describing various exemplary computing devices, workloads of these exemplary computing devices are to be generally described. The workloads refer to the amount of processing, computing, and/or data handling, among others that is expected to be executed by the exemplary computing devices. The workloads of the exemplary computing devices can encompass processes, tasks, operations, demands, threads, or the like that are placed on the resources of these exemplary computing devices, such as processing power, clock speed, number of cores, and/or cache memory, among others to provide some examples. The workloads of the exemplary computing devices can vary widely, from simple workloads such as word processing, to complex workloads such as video rendering, scientific simulations, and/or database queries, among others. As to be described in further detail below, the exemplary computing devices can include one or more compute agents, for example, one or more central processing units (CPUs), one or more graphical processing units (GPUs), and/or one or more neural processing units, among others. In some embodiments, the one or more compute agents can include consumer compute agents and/or producer compute agents. In these embodiments, the producer compute agents can create workloads to be performed by the consumer compute agents. As an example, the producer compute agents, such as central processing units (CPUs) to provide an example, can create workloads to display images that are associated with a video game. In this example, the consumer compute agents, such as graphical processing units (GPUs) to provide an example, can perform these workloads to generate the images.

Overview

Systems, methods, and apparatuses disclosed herein can advantageously leverage a power budget to manage heat. These systems, methods, and apparatuses can dynamically distribute the power budget to manage the heat. As part of this dynamic distribution, these systems, methods, and apparatuses can monitor their operation. In some embodiments, when this monitoring indicates that workloads are being created faster than being performed, these systems, methods, and apparatuses can be distributed more of the power budget to optimize the efficiency in performing these workloads. On the other hand, these systems, methods, and apparatuses can be distributed less of the power budget to optimize the efficiency in creating these workloads when this monitoring indicates workloads are being performed faster than being created.

First Exemplary Computing Device

FIG. 1 graphically illustrates a first exemplary computing device in accordance with various embodiments of the present disclosure. In the exemplary embodiment illustrated in FIG. 1, a computing device 100 can implement a thermal solution, also referred to as a cooling system or a heat dissipation solution, to manage heat generated during its operation. In some embodiments, as electric current flows through the computing device 100, some of this current can be converted from electrical energy into thermal energy, simply referred to as heat. In these embodiments, the thermal solution manages the heat generated by the computing device 100 to prevent the computing device 100 from suffering irreparable thermal damage. For example, the thermal solution can supplement the computing device 100 with various heatsinks, fans, cooling systems, heat pipes, graphite sheets, and/or vapor chamber cooling systems, among others, to manage the heat generated by the computing device 100. However, in some situations, the thermal solution can have trouble managing the heat generated by the computing device 100 when the computing device 100 is operating under a heavy workload, such as video rendering, scientific simulations, and/or database queries, among others, to provide some examples. For example, the heavy workload can be considered when computational resources, memory, and/or processing power, among others, of the computing device 100 approach, or exceed, eighty percent, ninety percent, or even close to one-hundred percent of their maximum capabilities. In this example, the heavy workload suggests that a significant portion of the computational resources, memory, and/or processing power, among others, of the computing device 100 are actively engaged performing the heavy workload. Often times, the heat generated by the computing device 100, when operating under the heavy workload, can increase beyond that which is capable of being managed by the thermal solution.

In the exemplary embodiment illustrated in FIG. 1, the computing device 100 can advantageously leverage a power budget to further manage the heat generated by the computing device 100. As to be described in further detail below, the power budget of the computing device 100 can be dynamically distributed amongst various agents, referred to as compute agents, of the computing device 100 to further manage the heat generated by the computing device 100. In some embodiments, the dynamic distribution of the power budget of the computing device 100 can beneficially manage the heat generated by the computing device 100, for example, when operating under the heavy workload. As part of this dynamic distribution, the computing device 100 can monitor the operation of the consumer compute agents from among the compute agents of the computing device 100. In some embodiments, when this monitoring indicates a producer compute agent from among the compute agents of the computing device 100 are creating workloads faster than the consumer compute agents can perform these workloads, the computing device 100 can dynamically distribute more of the power budget of the computing device 100 among these consumer compute agents to manage the heat generated by the computing device 100. On the other hand, the computing device 100 can dynamically distribute less of the power budget of the computing device 100 among these consumer compute agents to optimize the efficiency of these producer compute agents in creating these workloads when the monitoring indicates the consumer compute agents are capable of performing workloads faster than the producer compute agents can create these workloads to manage the heat generated by the computing device 100.

In the exemplary embodiment illustrated in FIG. 1, the computing device 100 can be implemented as a standalone electrical, mechanical, and/or electromechanical device, or a discrete device, and/or can be incorporated within or coupled to another electrical, mechanical, and/or electromechanical device, or a host device, such as a consumer electronics device, a cellular phone, a smartphones, a feature phone, a tablet computer, a wearable computer device, a personal digital assistant (PDAs), a wireless handset, a desktop computer, a laptop computer, an in-vehicle infotainment (IVIs), an in-car entertainment (ICE) device, an Instrument Cluster (IC), a head-up display (HUD) device, an onboard diagnostic (OBD) device, a dashtop mobile equipment (DME), a mobile data terminal (MDT), an Electronic Engine Management System (EEMS), an electronic/engine control units (ECU), an electronic/engine control modules (ECM), an embedded system, an engine management system (EMS), a networked or "smart" appliance, a Machine-Type-Communication (MTC) device, a Machine-to-Machine (M2M) device, a Internet of Things (IoT) device, and the like. As illustrated in FIG. 1, the computing device 100 can include compute agents 102.1 through 102.n that are communicatively coupled to one another via a data bus 104. In some embodiments, the compute agents 102.1 through 102.n can include, for example, one or more central processing units (CPUs), one or more graphical processing units (GPUs), and/or one or more neural processing units, among others. In some embodiments, the compute agents 102.1 through 102.n can be implemented together onto a common substrate, chip, die, or the like as a System on Chip (SoC). And although not illustrated in FIG. 1, those skilled in the relevant art(s) will recognize that the computing device 100 can further include other components not illustrated in FIG. 1, such as memory systems, input/output ports, networking components, peripheral interfaces, power management units, security components, and/or storage controllers, among others, that will be apparent to those skilled in the relevant art(s) without departing from the spirit and scope of the present disclosure.

As illustrated in FIG. 1, the computing device 100 includes a system management controller (SMC) 106 to monitor, manage, and/or control one or more system management functions of the computing device 100, such as thermal management and/or power management, among others. In some embodiments, the SMC 106 can be implemented as part of the SoC as described above. In the exemplary embodiment illustrated in FIG. 1, the SMC 106 includes a closed control loop temperature monitor (CLTM) 108 to monitor the temperature of the computing device 100 and/or the host device in a closed control loop manner. In some embodiments, the CLTM 108 represents an outer closed control loop from among multiple closed control loops of the computing device 100 to manage the heat generated by the computing device 100. As illustrated in FIG. 1, the CLTM 108 can estimate a system power budget 152 for the computing device 100 from the system component temperatures 150.1 through 150.r. In some embodiments, the CLTM 108 can iteratively estimate the system power budget 152 for the computing device 100 from the system component temperatures 150.1 through 150.r to manage the heat generated by the computing device 100. In the exemplary embodiment illustrated in FIG. 1, the CLTM 108 can represent one or more software routines, programs, tools, applications, and/or the like to monitor the temperature of the computing device 100 and/or the host device. These software routines, programs, tools, applications, and/or the like, when executed by the SMC 106 can monitor the temperature of the computing device 100 and/or the host device. Further, those skilled in the relevant art(s) will recognize that the one or more software routines, programs, tools, applications, and/or the like may be described herein as performing certain actions, routines, procedures, operations, flows, and/or the like without departing from the present disclosure. However, it should be appreciated that such descriptions are merely for convenience and that such actions in fact result from the SMC 106 executing the one or more software routines, programs, tools, applications, and/or the like.

As illustrated in FIG. 1, the SMC 106 can monitor system component temperatures 150.1 through 150.r. The SMC 106 can estimate the system component temperatures 150.1 through 150.r at one or more intervals in time $t_0$ through $t_k$, for example, once every millisecond, once every ten milliseconds, once every one-hundred milliseconds, once every second, once every ten seconds, and/or once every one-hundred seconds, among others. In some embodiments, the system component temperatures 150.1 through 150.r represent various temperatures that are associated with the computing device 100 and/or the host device. In these embodiments, the system component temperatures 150.1 through 150.r can represent temperatures of various components, such as one or more central processing units (CPUs), one or more graphical processing units (GPUs), one or more neural processing units, one or more motherboards, one or more memory systems, one or more power supply units (PSUs), one or more voltage regulator modules (VRMs), and/or one or more network interface cards (NICs), among others, within the computing device 100 and/or the host device. Alternatively, or in addition to, the system component temperatures 150.1 through 150.r can represent ambient temperatures of various locations within the computing device 100 and/or the host device. In the exemplary embodiment illustrated in FIG. 1, the CLTM 108 can estimate the system power budget 152 for the computing device 100 based on the system component temperatures 150.1 through 150.r. In some embodiments, the CLTM 108 can identify a system component temperature from among the system component temperatures 150.1 through 150.r that approaches, or exceeds, a thermal temperature constraint, for example, approaches, or exceeds, a thermal specification as indicated by a designer or a manufacturer, among others, to provide some examples.

The CLTM 108 estimates the system power budget 152 that constrains one or more compute agents from among the compute agents 102.1 through 102.n that is generating the heat causing the system component temperature to approach, or exceed, the thermal temperature constraint. In some embodiments, the CLTM 108 can convert the system component temperature from measurements in terms of temperature, for example, Fahrenheit (° F.), Celsius (° C.), or Kelvin (K), to measurements in terms of power, for example, watts (W), to determine a constrained system power budget for the computing device 100. After this conversion, the CLTM 108 can adjust, for example, reduce, the constrained system power budget to provide the system power budget 152 that causes the system component temperature to be less than the thermal constraint. In these embodiments, the system power budget 152 can be a numerical value between zero and one, with numerical values closer to one indicating that the computing device 100 is less constrained and consuming less power than numerical values closer to zero indicating that the computing device 100 is more constrained and consuming more power. The CLTM 108 is further described in U.S. patent application Ser. No. 11/212, 983, filed Aug. 25, 2005, now U.S. Pat. No. 8,374,730, U.S. patent application Ser. No. 17/208,928, filed Mar. 22, 2021, now U.S. Pat. No. 11,579,934, U.S. patent application Ser. No. 14/549,656, filed Nov. 21, 2014, now U.S. Pat. No. 9,494,994, and/or U.S. patent application Ser. No. 17/521, 567, filed Nov. 8, 2012, now U.S. Pat. No. 11,809,256, each of which is incorporated herein by reference in its entirety.

The compute agents 102.1 through 102.n can distribute the system power budget 152 amongst the compute agents 102.1 through 102.n to manage the heat generated by the computing device 100. In the exemplary embodiment illustrated in FIG. 1, the compute agents 102.1 through 102.*n* can implement a closed control loop feedback system to manage the heat generated by the computing device 100. In some embodiments, the compute agents 102.1 through 102.*n* represent an inner closed control loop from among multiple closed control loops of the computing device 100 to manage the heat generated by the computing device 100. As to be described in further detail below, the compute agents 102.1 through 102.*n* can dynamically distribute the system power budget 152 amongst themselves. In some embodiments, the compute agent 102.1 can provide component power budget 154.1 to itself, namely, the compute agent 102.1, and/or the component power budgets 154.2 through 154.*n* to the consumer compute agents 102.2 through 102.*n*. Thereafter, the compute agent 102.1 can control the distribution of the system power budget 152, for example, in response to performance metrics 156.1 through 156.*t* provided by the compute agents 102.1 through 102.*n*. As to be described in further detail below, the compute agent 102.1 can represent a producer compute agent and the compute agents 102.2 through 102.*n* can represent consumer compute agents. However, this designation of producer compute agents and consumer compute agents among the compute agents 102.1 through 102.*n* is for exemplary purposes only and not limiting. Rather, those skilled in the relevant art(s) will recognize that any one or more of the compute agents 102.1 through 102.*n* can be producer compute agents and any one or more of the compute agents 102.1 through 102.*n* can be consumer compute agents without departing from the spirit and scope of the present disclosure that operate in a substantially similar manner as to be described in further detail below.

As part of this closed control loop feedback system, the producer compute agent 102.1 can dynamically distribute the system power budget 152 amongst the producer compute agent 102.1 and/or the consumer compute agents 102.2 through 102.*n*. The producer compute agent 102.1 can control the distribution of the system power budget 152 amongst the producer compute agent 102.1 and/or the consumer compute agents 102.2 through 102.*n* in response to feedback describing the operation of the consumer compute agents 102.2 through 102.*n* as part of this closed control loop feedback system. In some embodiments, the closed control loop feedback system can include a producer compute agent closed-loop performance controller (CLPC) 110 residing within the producer compute agent 102.1 and consumer compute agents CLPCs 112.1 through 112.*m* residing within the consumer compute agents 102.2 through 102.*n*, respectively. Generally, the producer compute agent CLPC 110 and/or the consumer compute agents CLPCs 112.1 through 112.*m* can represent one or more software routines, programs, tools, applications, and/or the like that functionally cooperate with one another to distribute the system power budget 152. These software routines, programs, tools, applications, and/or the like, which are to be described in further detail below, that when executed by the compute agents 102.1 through 102.*n* functionally cooperate with one another to distribute the system power budget 152. Further, those skilled in the relevant art(s) will recognize that the one or more software routines, programs, tools, applications, and/or the like may be described herein as performing certain actions, routines, procedures, operations, flows, and/or the like without departing from the present disclosure. However, it should be appreciated that such descriptions are merely for convenience and that such actions in fact result from the compute agents 102.1 through 102.*n* executing the one or more software routines, programs, tools, applications, and/ or the like. In the exemplary embodiment illustrated in FIG. 1, the producer compute agent CLPC 110 can implement the closed-loop feedback system to dynamically partition the system power budget 152 into the component power budgets 154.1 through 154.*n*. In some embodiments, the producer compute agent CLPC 110 can include a closed-loop feedback controller, such as a proportional-integral (PI) controller, a proportional-integral-derivative (PID) controller, and/ or a proportional-derivative (PD) controller to provide some examples, to control the component power budgets 154.1 through 154.*n* as to be described in further detail below.

As illustrated in FIG. 1, the producer compute agent CLPC 110 can control the component power budgets 154.1 through 154.*n* in response to performance metrics 156.1 through 156.*t* provided by the consumer compute agents 102.2 through 102.*n*. Generally, the performance metrics 156.1 through 156.*t* are related to the energy consumption of the consumer compute agents 102.2 through 102.*n*, in terms of, for example, performance requirements and/or power consumption of the consumer compute agents 102.2 through 102.*n* and are to be described in further detail below. In some embodiments, the producer compute agent CLPC 110 can monitor the performance metrics 156.1 through 156.*t* to estimate the operation of the consumer compute agents 102.2 through 102.*n*. In these embodiments, the producer compute agent CLPC 110 can dynamically partition the system power budget 152 amongst the producer compute agent 102.1 and/or the consumer compute agents 102.2 through 102.*n* in response to the performance metrics 156.1 through 156.*t*.

In some embodiments, the producer compute agent CLPC 110 can dynamically partition more of the system power budget 152 to one or more power budgets from among the component power budgets 154.1 through 154.*n* when one or more performance metrics from among the performance metrics 156.1 through 156.*t* indicate that the producer compute agent 102.1 is creating workloads faster than one or more corresponding consumer compute agents from among the consumer compute agents 102.2 through 102.*n* can perform these workloads. For example, the producer compute agent CLPC 110 can dynamically partition more of the system power budget 152 to the one or more power budgets when the one or more performance metrics indicate the measured performance for one or more corresponding consumer compute agents to perform these workloads is more than the permitted performance allowed by the producer compute agent CLPC 110 to perform these workloads. As another example, the producer compute agent CLPC 110 can dynamically partition more of the system power budget 152 to the one or more power budgets when the one or more performance metrics indicate the measured power consumption for one or more corresponding consumer compute agents to perform these workloads is more than the permitted power consumption allowed by the producer compute agent CLPC 110 to perform these workloads.

Alternatively, or in addition to, the producer compute agent CLPC 110 can dynamically partition less of the system power budget 152 to one or more power budgets from among the component power budgets 154.1 through 154.*n* when one or more performance metrics from among the performance metrics 156.1 through 156.*t* indicate one or more corresponding consumer compute agents from among the consumer compute agents 102.2 through 102.*n* are capable of performing workloads faster than the producer compute agent 102.1 can create these workloads. And after dynamically partitioning the system power budget 152 into the component power budgets 154.1 through 154.*n*, the producer compute agent CLPC 110 can dynamically distribute the component power budgets 154.1 through 154.$n$ to the consumer compute agents 102.2 through 102.$n$. For example, the producer compute agent CLPC 110 can dynamically partition less of the system power budget 152 to the one or more power budgets when the one or more performance metrics indicate the measured performance for one or more corresponding consumer compute agents to perform these workloads is less than the permitted performance allowed by the producer compute agent CLPC 110 to perform these workloads. As another example, the producer compute agent CLPC 110 can dynamically partition more of the system power budget 152 to the one or more power budgets when the one or more performance metrics indicate the measured power consumption for one or more corresponding consumer compute agents to perform these workloads is less than the permitted power consumption allowed by the producer compute agent CLPC 110 to perform these workloads.

In the exemplary embodiment illustrated in FIG. 1, the compute agents 102.1 through 102.$n$ can operate in accordance with the component power budgets 154.1 through 154.$n$. In some embodiments, the operation of the compute agents 102.1 through 102.$n$ can generate the heat within the computing device and/or the host device as described above which is measured as the system component temperatures 150.1 through 150.$r$. In some embodiments, the producer compute agent CLPC 110 and/or the consumer compute agents CLPCs 112.1 through 112.$m$ can configure the producer compute agents 102.1 and the consumer compute agents 102.2 through 102.$n$, respectively, to operate in accordance with the component power budgets 154.1 through 154.$n$. In some embodiments, the producer compute agent CLPC 110 and/or the consumer compute agents CLPCs 112.1 through 112.$m$ can execute dynamic voltage and frequency management (DVFM) to configure the compute agents 102.1 through 102.$n$ in accordance with the component power budgets 154.1 through 154.$n$. As part of this DVFM, the producer compute agent CLPC 110 and/or the consumer compute agents CLPCs 112.1 through 112.$m$ can determine the operating voltages and/or the operating frequencies of the producer compute agents 102.1 and the consumer compute agents 102.2 through 102.$n$, respectively, in accordance with the component power budgets 154.1 through 154.$n$. In some embodiments, the producer compute agent CLPC 110 and/or the consumer compute agents CLPCs 112.1 can determine the operating voltages and/or the operating frequencies of the producer compute agents 102.1 and the consumer compute agents 102.2 through 102.$n$, respectively, such that the power consumption of the compute agents 102.1 through 102.$n$ does not exceed the component power budgets 154.1 through 154.$n$. During operation, the consumer compute agents CLPCs 112.1 through 112.$m$ can determine the performance metrics 156.1 through 156.$t$ describing the operation of the consumer compute agents 102.2 through 102.$n$. In some embodiments, the performance metrics 156.1 through 156.$t$ can indicate the utilization and/or the power consumption of the consumer compute agents 102.2 through 102.$n$. In these embodiments, the consumer compute agents CLPCs 112.1 through 112.$m$ can measure the utilization and/or power consumption of the consumer compute agents 102.2 through 102.$n$. In some embodiments, the performance metrics 156.1 through 156.$t$ can describe the operation of the consumer compute agents 102.2 through 102.$n$ using signed numerical value. In these embodiments, a negative value for one or more of the performance metrics 156.1 through 156.$t$ can indicate the measured power consumption for one or more corresponding consumer compute agents to perform workloads is more than the permitted power consumption allowed by the producer compute agent CLPC 110 to perform these workloads. As such, the producer compute agent CLPC 110 can dynamically partition less of the system power budget 152 to one or more power budgets from among the component power budgets 154.1 through 154.$n$ that are associated with the one or more corresponding consumer compute agents in a substantially similar manner as describe above. In these embodiments, a positive value for one or more of the performance metrics 156.1 through 156.$t$ can indicate the measured power consumption for one or more corresponding consumer compute agents to perform workloads is less than the permitted power consumption allowed by the producer compute agent CLPC 110 to perform these workloads. As such, the producer compute agent CLPC 110 can dynamically partition more of the system power budget 152 to one or more power budgets from among the component power budgets 154.1 through 154.$n$ that are associated with the one or more corresponding consumer compute agents in a substantially similar manner as describe above.

In the exemplary embodiment illustrated in FIG. 1, the data bus 104 represents a communication system for transferring digital data, such as or the component power budgets 154.1 through 154.$n$ and/or the performance metrics 156.1 through 156.$t$ to provide some examples, among the compute agents 102.1 through 102.$n$. In some embodiments, the data bus 104 can include one or more address buses, data buses, control buses, system buses, peripheral component interconnect (PCI) buses, one or more universal serial bus (USB) buses, and/or inter-integrated circuit (I2C) buses, among others, to provide some examples. In some embodiments, the data bus 104 can be implemented as a parallel data bus that simultaneously provides multiple bits of data on separate lines and/or a serial data bus that sequentially provides multiple bits of data on separate lines.

Exemplary Operation of the First Exemplary Computing Device

Figure 2:
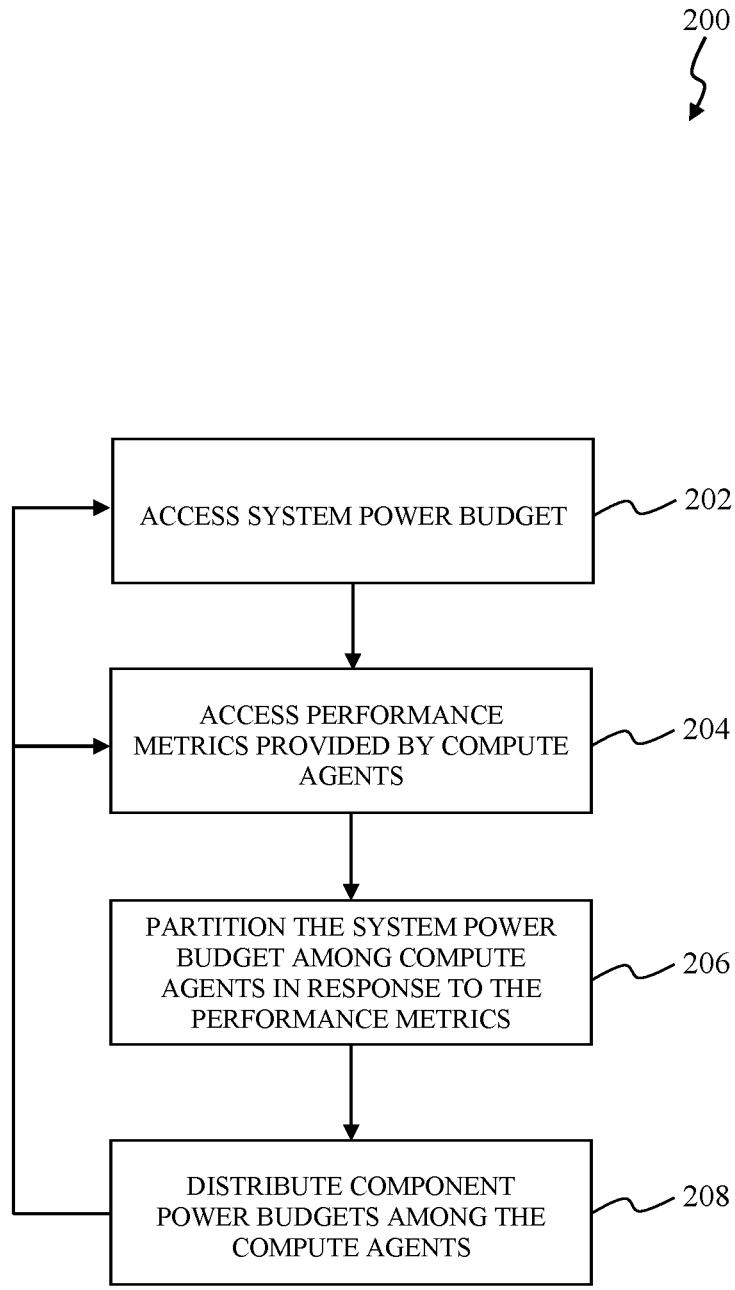
FIG. 2 illustrates a flowchart of an exemplary operation of exemplary compute agents of the first exemplary computing device in accordance with various embodiments of the present disclosure.

FIG. 2 illustrates a flowchart of an exemplary operation of exemplary compute agents of the first exemplary computing device in accordance with various embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 for dynamically distributing a system power budget of the first exemplary computing device, such as the computing device 100 as described above to provide an example. The operational control flow 200 can be executed by one or more compute agents, such as one or more of the compute agents 102.1 through 102.$n$ as described above to provide an example.

At operation 202, the operational control flow 200 accesses the system power budget, such as the system power budget 152, that can be provided by a system management controller (SMC), such as the SMC 106. In some embodiments, the operational control flow 200 can receive the system power budget from the system management controller in a substantially similar manner as described above. In some embodiments, the system power budget can be related to a temperate within the first exemplary computing device. In these embodiments, the system power budget can be converted from a system component temperature that, for example, indicates the first exemplary computing device is operating under the heavy workload in a substantially similar manner as described above. In these embodiments, the system component temperature can be converted from measurements in terms of temperature, for example, Fahrenheit (° F.), Celsius (° C.), or Kelvin (K), to measurements in terms of power, for example, watts (W), to determine a constrained system power budget for the first exemplary computing device. After this conversion, the system component temperature can be adjusted to provide the system power budget that causes the system component temperature to be less than a thermal constraint in a substantially similar manner as described above.

At operation 204, the operational control flow 200 accesses performance metrics, such as the performance metrics 156.1 through 156.t as described above, which are provided by the one or more compute agents. In some embodiments, the operational control flow 200 can receive the performance metrics from the one or more compute agents in a substantially similar manner as described above.

At operation 206, the operational control flow 200 partitions the system power budget among the one or more compute agents to provide component power budgets, such as the component power budgets 154.1 through 154.n, in a substantially similar manner as described above.

At operation 208, the operational control flow 200 distributes the component power budgets from operation 206 among the one or more compute agents in a substantially similar manner as described above. The operational control flow 200 reverts to operation 202 to access a new system power budget and new performance metrics or operation 204 to access the new performance metrics.

Figure 3:
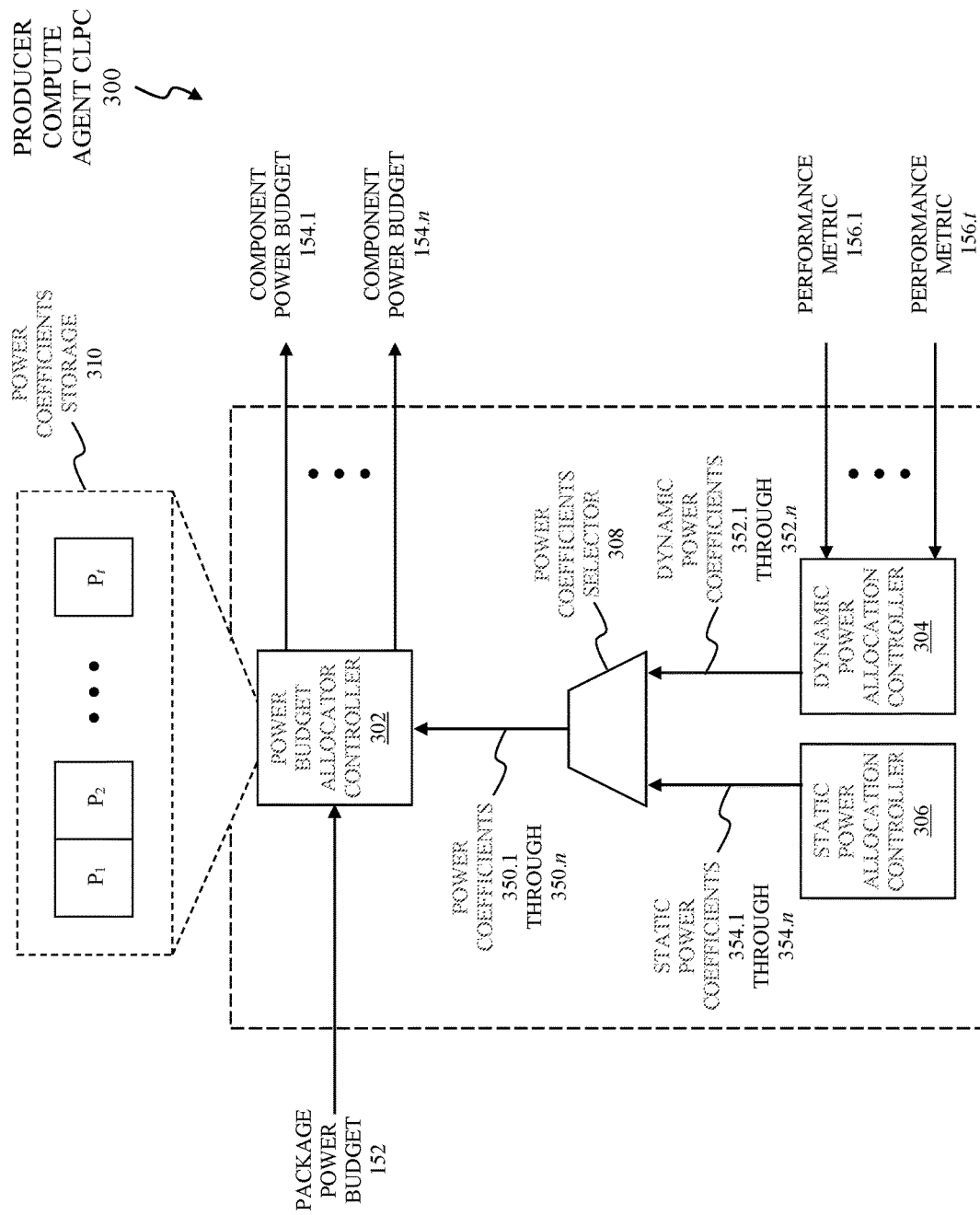
FIG. 3 graphically illustrates a block diagram of an exemplary producer compute agent that can be implemented within the first exemplary computing device in accordance with various embodiments of the present disclosure.

Exemplary Producer Compute Agent that can be Implemented within the First Exemplary Computing Device FIG. 3 graphically illustrates a block diagram of an exemplary producer compute agent that can be implemented within the first exemplary computing device in accordance with various embodiments of the present disclosure. In the exemplary embodiment illustrated in FIG. 3, a producer compute agent closed-loop performance controller (CLPC) 300 can control the component power budgets 154.1 through 154.n in response to performance metrics 156.1 through 156.t provided by the consumer compute agents 102.2 through 102.n. As to be described in further detail below, the producer compute agent CLPC 300 can partition the system power budget 152 in response to the performance metrics 156.1 through 156.t in a substantially similar manner as described above. Moreover, as illustrated in FIG. 3, the producer compute agent CLPC 300 can include a power budget allocator controller 302, a dynamic power allocation controller 304, a static power allocator controller 306, and a power coefficient selector 308. In the exemplary embodiment illustrated in FIG. 3, the power budget allocator controller 302, the dynamic power allocation controller 304, the static power allocator controller 306, and/or the power coefficient selector 308 can represent one or more software routines, programs, tools, applications, and/or the like to partition the system power budget 152. These software routines, programs, tools, applications, and/or the like, that when executed by a compute agent, such as the producer compute agent 102.1 to provide an example, can partition the system power budget 152. Further, those skilled in the relevant art(s) will recognize that the one or more software routines, programs, tools, applications, and/or the like may be described herein as performing certain actions, routines, procedures, operations, flows, and/or the like without departing from the present disclosure. However, it should be appreciated that such descriptions are merely for convenience and that such actions in fact result from the compute agent executing the one or more software routines, programs, tools, applications, and/or the like. In some embodiments, the producer compute agent CLPC 300 can represent an exemplary embodiment of the producer compute agent CLPC 110 as described above.

The power budget allocator controller 302 can partition the system power budget 152 among the compute agents 102.1 through 102.n in response to power coefficients 350.1 through 350.n, which are to be described in further detail below. Generally, the power coefficients 350.1 through 350.n indicate the partitioning of the system power budget 152 among the compute agents 102.1 through 102.n. In some embodiments, the power coefficients 350.1 through 350.n can represent one or more alphabetical, numeric, and/or alphanumeric values that indicate the manner that the power budget allocator controller 302 is to partition the system power budget 152 among the compute agents 102.1 through 102.n. For example, the power coefficients 350.1 through 350.n can represent numerical percentages of the system power budget 152 that is to be used for each corresponding compute agent from among the compute agents 102.1 through 102.n. As illustrated in FIG. 3, the power budget allocator controller 302 can store the power coefficients 350.1 through 350.n as a data structure $P_1$ through Pt in a power coefficients storage 310. In some embodiments, the power coefficients storage 310 can be implemented as a computer-readable medium, such as a read only memory (ROM), a random-access memory (RAM), a magnetic disk storage media, an optical storage media, and/or a flash memory device, among others. In these embodiments, the power coefficients storage 310 can be configured and arranged to be a cache memory that is easily accessible by the budget allocator controller 302 as will be apparent to hose skilled in the relevant art(s) without departing from the spirit and scope of the present disclosure. In some embodiments, the power budget allocator controller 302 can determine the component power budgets 154.1 through 154.n based on the power coefficients 350.1 through 350.n. In these embodiments, the power budget allocator controller 302 can multiply the system power budget 152 and the power coefficients 350.1 through 350.n to determine the component power budgets 154.1 through 154.n to partition the system power budget 152 among the component power budgets 154.1 through 154.n.

The dynamic power allocation controller 304 can determine dynamic power coefficients 352.1 through 352.n in response to the performance metrics 156.1 through 156.t. In some embodiments, the dynamic power allocation controller 304 can include a closed-loop feedback controller, such as a proportional-integral (PI) controller, a proportional-integral-derivative (PID) controller, and/or a proportional-derivative (PD) controller to provide some examples, to dynamically determine the dynamic power coefficients 352.1 through 352.n in response to the performance metrics 156.1 through 156.t to effectively control the dynamic power coefficients 352.1 through 352.n. In some embodiments, the closed-loop feedback controller can compare the performance metrics 156.1 through 156.t and the dynamic power coefficients 352.1 through 352.n to determine power coefficient margins that are associated with the dynamic power coefficients 352.1 through 352.n. In these embodiments, the closed-loop feedback controller can dynamically adjust each of the dynamic power coefficients 352.1 through 352.n to minimize its corresponding power coefficient margin from among these power coefficient margins.

In some embodiments, the dynamic power allocation controller 304 can dynamically adjust, for example, increase, one or more dynamic power coefficients from among the dynamic power coefficients 352.1 through 352.n when one or more performance metrics from among the performance metrics 156.1 through 156.t indicate that the producer compute agent 102.1 is creating workloads faster than one or more corresponding consumer compute agents from among the consumer compute agents 102.2 through 102.n can perform these workloads to minimize their corresponding power coefficient margins from among these power coefficient margins. For example, the dynamic power allocation controller 304 can dynamically increase the one or more dynamic power coefficients when the one or more performance metrics indicate the measured performance for one or more corresponding consumer compute agents to perform these workloads is more than the permitted performance allowed by the dynamic power allocation controller 304 to perform these workloads. As another example, the dynamic power allocation controller 304 can dynamically increase the one or more dynamic power coefficients when the one or more performance metrics indicate the measured power consumption for one or more corresponding consumer compute agents to perform these workloads is less than the permitted power consumption allowed by the dynamic power allocation controller 304 to perform these workloads. In some embodiments, the dynamic power allocation controller 304 can iteratively adjust the dynamic power coefficients 352.1 through 352.n, for example, in accordance with a binary sequence, an arithmetic sequence, a geometric sequence, and/or an exponential growth sequence, among others.

Alternatively, or in addition to, the dynamic power allocation controller 304 can dynamically adjust, for example, decrease, one or more dynamic power coefficients from among the dynamic power coefficients 352.1 through 352.n when one or more performance metrics from among the performance metrics 156.1 through 156.t indicate that the producer compute agent 102.1 is creating workloads slower than one or more corresponding consumer compute agents from among the consumer compute agents 102.2 through 102.n can perform these workloads, thereby minimizing their corresponding power coefficient margins from among these power coefficient margins. For example, the dynamic power allocation controller 304 can dynamically decrease the one or more dynamic power coefficients when the one or more performance metrics indicate the measured performance for one or more corresponding consumer compute agents to perform these workloads is less than the permitted performance allowed by the dynamic power allocation controller 304 to perform these workloads. As another example, the dynamic power allocation controller 304 can dynamically decrease the one or more dynamic power coefficients when the one or more performance metrics indicate the measured power consumption for one or more corresponding consumer compute agents to perform these workloads is less than the permitted power consumption allowed by the dynamic power allocation controller 304 to perform these workloads.

The static power allocation controller 306 can determine static power coefficients 354.1 through 354.n. In some embodiments, the static power coefficients 354.1 through 354.n represents a pre-determined, preset partitioning of the system power budget 152 among the compute agents 102.1 through 102.n. In these embodiments, each static power coefficient from among the static power coefficients 354.1 through 354.n can represent a pre-determined, preset percentage of the system power budget 152 that is to be allocated to each component power budget from among the component power budgets 154.1 through 154.n.

The power coefficient selector 308 can select the power coefficients 350.1 through 350.n from among the dynamic power coefficients 352.1 through 352.n and the static power coefficients 354.1 through 354.n.

Figure 4:
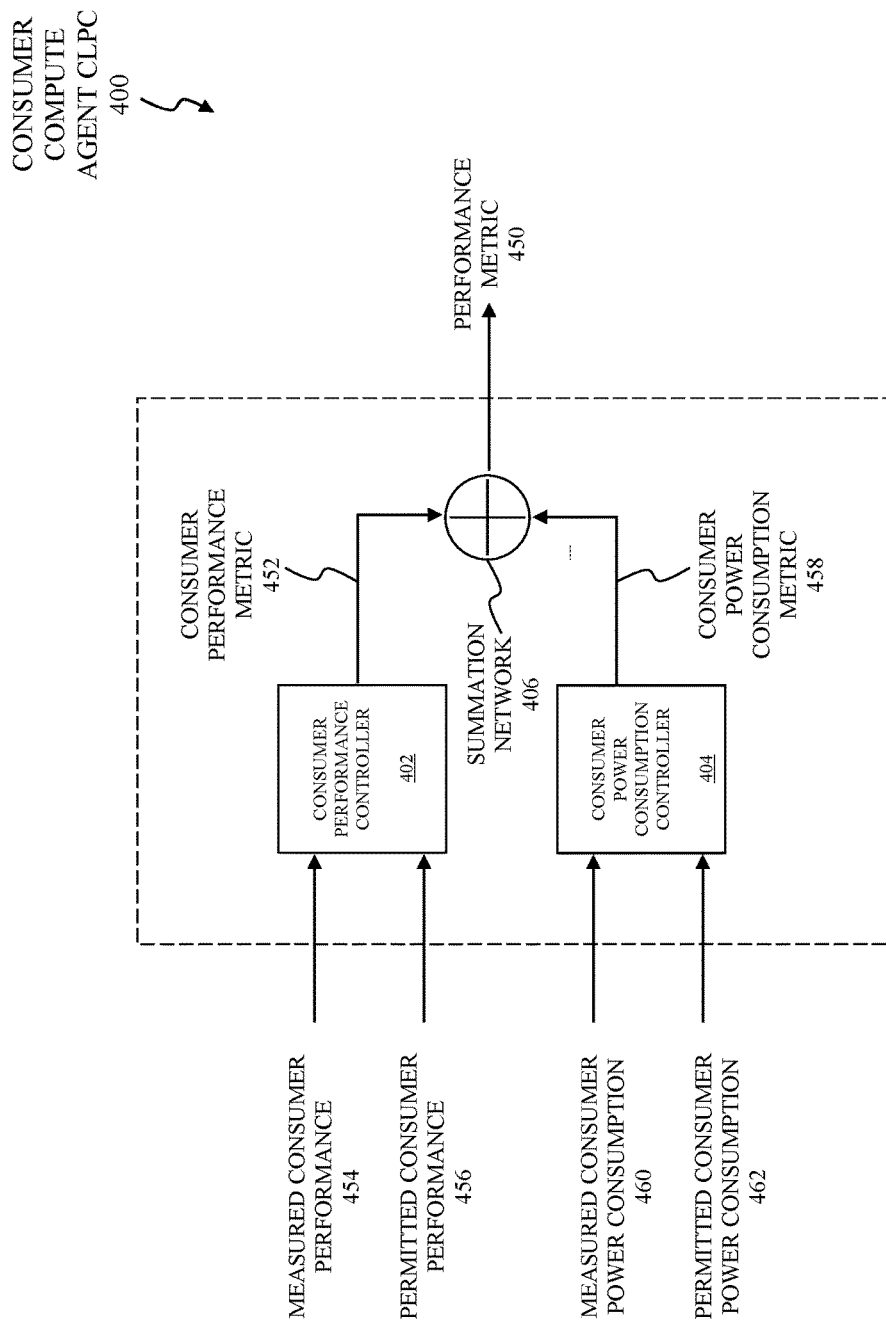
FIG. 4 graphically illustrates a block diagram of an exemplary consumer compute agent that can be implemented within the first exemplary computing device in accordance with various embodiments of the present disclosure.

Exemplary Consumer Compute Agent that can be Implemented within the First Exemplary Computing Device FIG. 4 graphically illustrates a block diagram of an exemplary consumer compute agent that can be implemented within the first exemplary computing device in accordance with various embodiments of the present disclosure. In the exemplary embodiment illustrated in FIG. 4, a consumer compute agent closed-loop performance controller (CLPC) 400 can generate a consumer performance metric 450 that can be used to control a corresponding component power budget from among the component power budgets 154.1 through 154.n in a substantially similar manner as described above. Generally, the consumer performance metric 450 is related to the energy consumption of a consumer compute agent, for example, from among the consumer compute agents 102.2 through 102.n, in terms of, for example, performance requirements and/or power consumption of the consumer compute agent as to be described in further detail below. Moreover, as illustrated in FIG. 4, the consumer compute agent CLPC 400 can include a consumer performance controller 402, a consumer power consumption controller 404, a summation network 406. In the exemplary embodiment illustrated in FIG. 4, the consumer performance controller 402, the consumer power consumption controller 404, and/or the summation network 406 can represent one or more software routines, programs, tools, applications, and/or the like to generate the consumer performance metric 450. These software routines, programs, tools, applications, and/or the like, which are to be described in further detail below, that when executed by a consumer compute agent, such as one or more of the consumer compute agents 102.2 through 102.n to provide an example, can generate the consumer performance metric 450. Further, those skilled in the relevant art(s) will recognize that the one or more software routines, programs, tools, applications, and/or the like may be described herein as performing certain actions, routines, procedures, operations, flows, and/or the like without departing from the present disclosure. However, it should be appreciated that such descriptions are merely for convenience and that such actions in fact result from the consumer compute agent executing the one or more software routines, programs, tools, applications, and/or the like. In some embodiments, the consumer compute agent CLPC 400 can represent an exemplary embodiment of one or more of the consumer compute agents CLPCs 112.1 through 112.m as described above.

The consumer performance controller 402 can provide a consumer performance metric 452 based upon a measured consumer performance 454 and a permitted consumer performance 456. In the exemplary embodiment illustrated in FIG. 4, the measured consumer performance 454 indicates a utilization of resources, such as processing power, clock speed, number of cores, and/or cache memory, among others to provide some examples, of the consumer compute agent in performing a workload and the permitted consumer performance 456 represents the maximum utilization of the resources that is allowed to the consumer compute agent to perform the workload. As illustrated in FIG. 4, the consumer performance controller 402 can provide the consumer performance metric 452 in response to comparing the measured consumer performance 454 and the permitted consumer performance 456. In some embodiments, the consumer performance controller 402 can include a closed-loop feedback controller, such as a proportional-integral (PI) controller, a proportional-integral-derivative (PID) controller, and/or a proportional-derivative (PD) controller to provide some examples, to dynamically determine the consumer performance metric 452 in response to the measured consumer performance 454 and the permitted consumer performance 456. In some embodiments, the consumer performance controller 402 can compare the measured consumer performance 454 and the permitted consumer performance 456 to determine a consumer performance metric 452 that represents a margin between the measured consumer performance 454 and the permitted consumer performance 456. In some embodiments, the consumer performance metric 452 can be a positive or negative numerical value with positive numerical values indicating that the consumer compute agent is operating under the heavy workload, namely, the measured consumer performance 454 is greater than the permitted consumer performance 456, and negative values indicating that the consumer compute agent is not operating under the heavy workload, namely, the measured consumer performance 454 is less than the permitted consumer performance 456.

The consumer power consumption controller 404 can provide a consumer power consumption metric 458 based upon a measured consumer power consumption 460 and a permitted consumer power consumption 462. In the exemplary embodiment illustrated in FIG. 4, the measured consumer power consumption 460 indicates a power consumption of the consumer compute agent in performing a workload and the permitted consumer power consumption 462 represents the maximum power consumption allowed to the consumer compute agent to perform the workload, such as one of the component power budgets 154.2 through 154.$n$ to provide an example. As illustrated in FIG. 4, the consumer power consumption controller 404 can provide the consumer power consumption metric 458 in response to comparing the measured consumer power consumption 460 and the permitted consumer power consumption 462. In some embodiments, the consumer power consumption controller 404 can include a closed-loop feedback controller, such as a proportional-integral (PI) controller, a proportional-integral-derivative (PID) controller, and/or a proportional-derivative (PD) controller to provide some examples, to dynamically determine the consumer power consumption metric 458 in response to the measured consumer power consumption 460 and the permitted consumer power consumption 462. In some embodiments, the consumer power consumption controller 404 can compare the measured consumer power consumption 460 and the permitted consumer power consumption 462 to determine the consumer power consumption metric 458 that represents a margin between the measured consumer power consumption 460 and the permitted consumer power consumption 462. In some embodiments, the consumer power consumption metric 458 can be a positive or negative numerical value with positive numerical values indicating that the consumer compute agent is operating under the heavy workload, namely, the measured consumer power consumption 460 is greater than the permitted consumer power consumption 462, and negative values indicating that the consumer compute agent is not operating under the heavy workload, namely, the measured consumer power consumption 460 is less than the permitted consumer power consumption 462.

The summation network 406 determines the consumer performance metric 450, such as one of the performance metrics 156.1 through 156.$t$ to provide an example, based upon the consumer performance metric 452 and the consumer power consumption metric 458. In some embodiments, the summation network 406 can subtract the consumer power consumption metric 458 from the consumer performance metric 452 to determine the consumer performance metric 450. In these embodiments, a negative value for the consumer performance metric 450 can indicate a producer compute agent, such as the producer compute agent 102.1 to provide an example, is creating workloads faster than the consumer compute agent perform these workloads. As such, more of the power budget should be distributed to the consumer compute agent to optimize the efficiency of the consumer compute agent in performing these workloads in a substantially similar manner as described above. In these embodiments, a positive value for the consumer performance metric 450 can indicate the producer consumer compute agent is creating workloads slower than the consumer compute agent perform these workloads. As such, less of the power budget should be distributed to the consumer compute agent to optimize the efficiency of the consumer compute agent in performing these workloads in a substantially similar manner as described above.

Second Exemplary Computing Device

Figure 5:
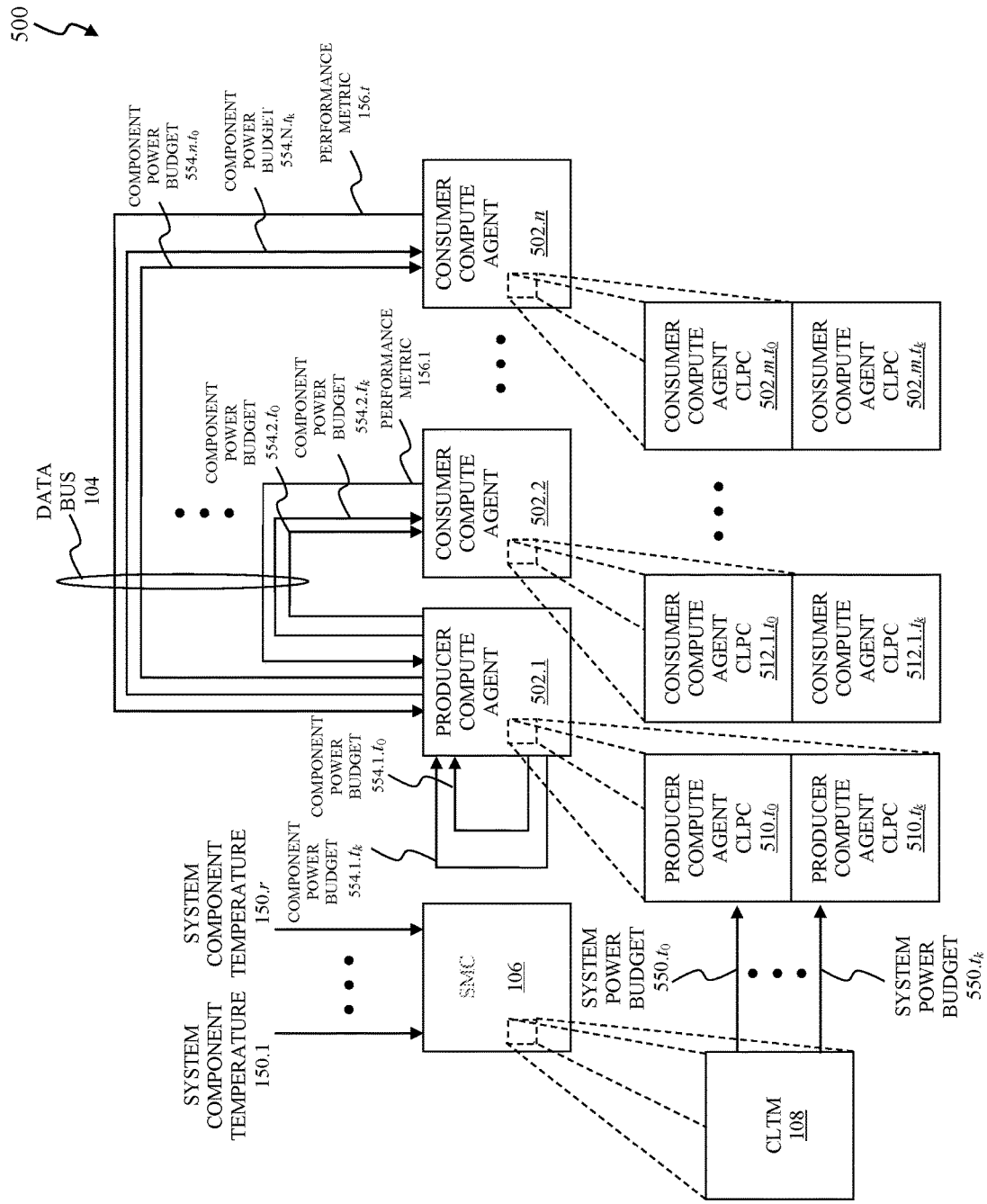
FIG. 5 graphically illustrates a second exemplary computing device in accordance with various embodiments of the present disclosure.

FIG. 5 graphically illustrates a second exemplary computing device in accordance with various embodiments of the present disclosure. In the exemplary embodiment illustrated in FIG. 5, a power budget of the computing device 500 can be dynamically distributed amongst various agents, referred to as compute agents, of the computing device 500 at one or more intervals in time $t_0$ through $t_k$, for example, once every millisecond, once every ten milliseconds, once every one-hundred milliseconds, once every second, once every ten seconds, and/or once every one-hundred seconds, among others to further manage the heat generated by the computing device 500. As part of this dynamic distribution, the computing device 500 can monitor the operation of the consumer compute agents from among the compute agents of the computing device 500 at the one or more intervals in time $t_0$ through $t_k$. In some embodiments, the one or more intervals in time $t_0$ through $t_k$ can provide variable granularity to the distribution of the power budget of the computing device 500. In these embodiments, this variable granularity allows the computing device 500 to efficiently monitor various aspects of the computing device 500 that can rise in temperature quickly, such as one or more central processing units (CPUs), one or more graphical processing units (GPUs), one or more neural processing units, one or more motherboards, one or more memory systems, one or more power supply units (PSUs), one or more voltage regulator modules (VRMs), and/or one or more network interface cards (NICs), among others, within the computing device 500 and at the same time monitor various aspects of the computing device 500 that can rise in temperature slowly, such as the ambient temperatures of various locations within the computing device 500 to provide an example. In some embodiments, when this monitoring indicates the producer compute agents from among the compute agents of the computing device 500 are creating workloads faster than the consumer compute agents can perform these workloads, the computing device 500 can dynamically distribute more of the power budget of the computing device 500 among these consumer compute agents to optimize the efficiency of these consumer compute agents in performing these workloads to manage the heat generated by the computing device 500. On the other hand, the computing device 500 can dynamically distribute less of the power budget of the computing device 500 among these consumer compute agents to optimize the efficiency of these producer compute agents in creating these workloads when this monitoring indicates the consumer compute agents are capable of performing workloads faster than the producer compute agents can create these workloads to manage the heat generated by the computing device 500. The computing device 500 shares many substantially similar features as the computing device 100. Therefore, only differences between the computing device 100 and the computing device 500 are to be described in further detail below.

As illustrated in FIG. 5, the SMC 106 can measure system component temperatures 150.1 through 150.$r$ at the one or more intervals in time $t_0$ through $t_k$, for example, once every millisecond, once every ten milliseconds, once every one-hundred milliseconds, once every second, once every ten seconds, and/or once every one-hundred seconds, among others. For example, the SMC 106 can measure system component temperatures of various components, such as one or more central processing units (CPUs), one or more graphical processing units (GPUs), one or more neural processing units, one or more motherboards, one or more memory systems, one or more power supply units (PSUs), one or more voltage regulator modules (VRMs), and/or one or more network interface cards (NICs), among others, within the computing device 500 once every millisecond and ambient temperatures of various locations within the computing device 500 and/or the host device once every second to provide the system component temperatures 150.1 through 150.$r$ at the one or more intervals in time $t_0$ through $t_k$. In some embodiments, the CLTM 108 can identify a system component temperature from among the system component temperatures 150.1 through 150.$r$ for each of the one or more intervals in time $t_0$ through $t_k$ that indicates the computing device 500 is operating under the heavy workload, for example, more than a thermal constraint for the one or more intervals in time $t_0$ through $t_k$, to provide system power budgets 550.$t_0$ through 550.$t_k$ in a substantially similar manner as described above.

The compute agents 502.1 through 502.$n$ can distribute the component power budgets 554.1.$t_0$ through 554.$n$.$t_k$ amongst the compute agents 502.1 through 502.$n$ to manage the heat generated by the computing device 500 in a substantially similar manner as described above. As illustrated in FIG. 5, the producer compute agent 502.1 can distribute the component power budgets 554.1.$t_0$ through 554.1.$t_k$ to the consumer compute agent 502.2 and the component power budgets 554.$n$.$t_0$ through 554.$n$.$t_k$ to the compute agent 502.$t$ to manage the heat generated by the computing device 500 over the one or more intervals in time $t_0$ through $t_k$. In the exemplary embodiment illustrated in FIG. 5, the compute agents 502.1 through 502.$n$ can implement a closed control loop feedback system in a substantially similar manner as the compute agents 102.1 through 102.$n$ to manage the heat generated by the computing device 500. As to be described in further detail below, the compute agents 502.1 through 502.$n$ can dynamically distribute the system power budgets 550.$t_0$ through 550.$t_k$ amongst the consumer compute agents 502.2 through 502.$n$ to provide component power budgets 554.1.$t_0$ through 554.$n$.$t_k$ to the consumer compute agents 502.2 through 502.$n$ to manage the heat generated by the computing device 500 over the one or more intervals in time $t_0$ through $t_k$. Thereafter, the compute agents 502.1 through 502.$n$ can control the component power budgets 554.1.$t_0$ through 554.$n$.$t_k$ over the one or more intervals in time $t_0$ through $t_k$ in response to the performance metrics 156.1 through 156.$t$ provided by the compute agents 502.1 through 502.$n$. In some embodiments, the producer compute agents CLPC 510.$t_0$ can control the component power budgets 554.1.$t_0$ through 554.$n$.$t_k$ over the one or more intervals in time $t_0$ through $t_k$ and the producer compute agents CLPC 510.$t_k$ can control the component power budgets 554.1.$t_k$ through 554.$n$.$t_k$ over the one or more intervals in time $t_0$ through $t_k$ in response to the performance metrics 156.1 through 156.$t$ in a substantially similar manner as described above.

In the exemplary embodiment illustrated in FIG. 5, the consumer compute agents 502.2 through 502.$n$ can operate in accordance with the component power budgets 554.1.$t_0$ through 554.$n$.$t_k$ in a substantially similar manner as described above. During operation, the consumer compute agents CLPCs 512.1 through 512.$m$ can determine the performance metrics 156.1 through 156.$t$ describing the operation of the consumer compute agents 502.2 through 502.$n$. one or more intervals in time $t_0$ through $t_k$ in a substantially similar manner as described above.

Figure 6:
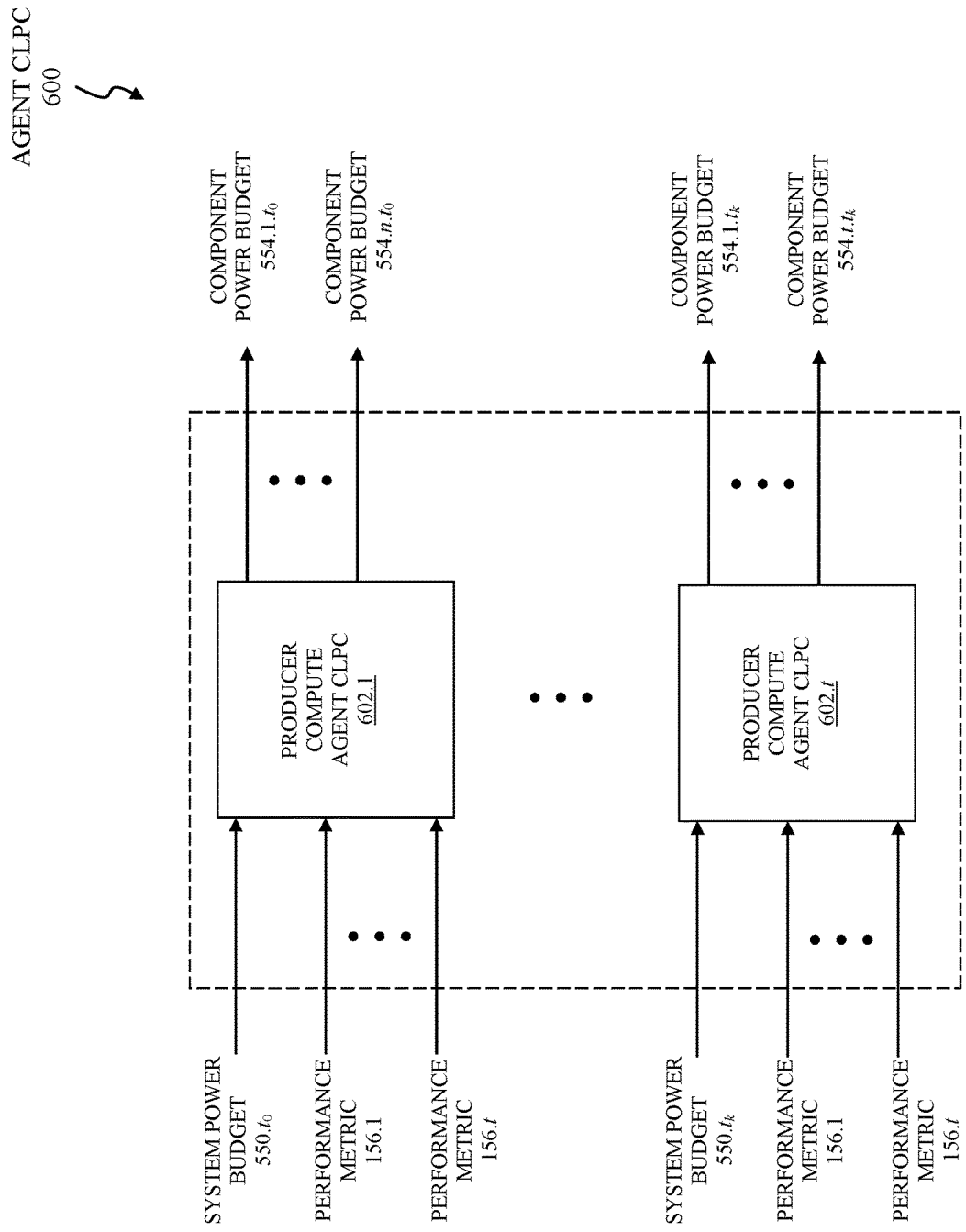
FIG. 6 graphically illustrates a block diagram of an exemplary producer compute agent that can be implemented within the second exemplary computing device in accordance with various embodiments of the present disclosure.

Exemplary Producer Compute Agent that can be Implemented within the Second Exemplary Computing Device FIG. 6 graphically illustrates a block diagram of an exemplary producer compute agent that can be implemented within the second exemplary computing device in accordance with various embodiments of the present disclosure. In the exemplary embodiment illustrated in FIG. 6, a producer compute agent closed-loop performance controller (CLPC) 600 can control the component power budgets 554.1.$t_0$ through 554.$n$.$t_k$ over the one or more intervals in time to through $t_k$ in response to performance metrics 156.1 through 156.$t$ provided by the consumer compute agents 502.2 through 502.$n$. The producer compute agent CLPC 600 can partition the system power budgets 550.$t_0$ through 550.$t_k$ over the one or more intervals in time $t_0$ through $t_k$ in response to the performance metrics 156.1 through 156.$t$ in a substantially similar manner as described above. Moreover, as illustrated in FIG. 6, the producer compute agent CLPC 600 can include producer compute agents CLPC 602.1 through 602.$t$ to dynamically partition the system power budgets 550.$t_0$ through 550.$t_k$ over the one or more intervals in time $t_0$ through $t_k$. In some embodiments, the producer compute agent CLPC 602.1 can dynamically partition the system power budget 550.$t_0$ to provide the component power budgets 554.1.$t_0$ through 554.$n$.$t_0$ and the producer compute agent CLPC 602.$t$ can dynamically partition the system power budget 550.$t_k$ to provide the component power budgets 554.1.$t_k$ through 554.$n$.$t_k$ over the one or more intervals in time $t_0$ through $t_k$. In the exemplary embodiment illustrated in FIG. 6, each producer compute agent from among the producer compute agents CLPC 602.1 through 602.$t$ operates in a substantially similar manner as the producer compute agent CLPC 300 as described above and will not be described in further detail below.

Figure 7:
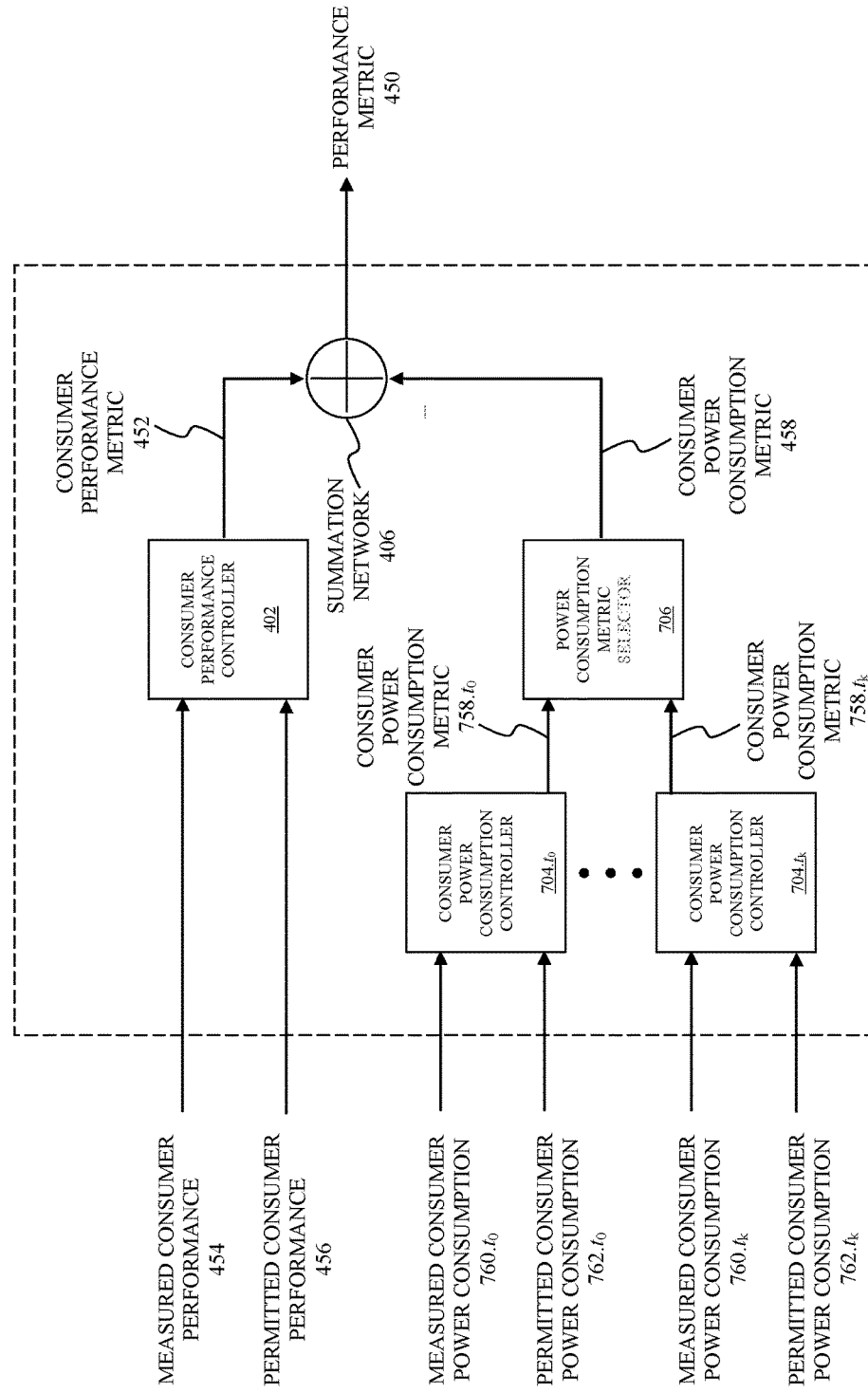
FIG. 7 graphically illustrates a block diagram of an exemplary consumer compute agent that can be implemented within the second exemplary computing device in accordance with various embodiments of the present disclosure.

Exemplary Consumer Compute Agent that can be Implemented within the Second Exemplary Computing Device FIG. 7 graphically illustrates a block diagram of an exemplary consumer compute agent that can be implemented within the second exemplary computing device in accordance with various embodiments of the present disclosure. In the exemplary embodiment illustrated in FIG. 7, a consumer compute agent closed-loop performance controller (CLPC) 700 can generate the consumer performance metric 450 that can be used to control a corresponding component power budget from among the component power budgets 154.1 through 154.$n$ in a substantially similar manner as described above. Moreover, as illustrated in FIG. 7, the consumer compute agent CLPC 700 can include the consumer performance controller 402, the summation network 406, and consumer power consumption controllers 704.$t_0$ through 704.$t_k$. The CLPC 700 shares many substantially similar features as the CLPC 400. Therefore, only differences between the CLPC 400 and the CLPC 700 are to be described in further detail below.

The consumer power consumption controllers 704.$t_0$ through 704.$t_k$ provide consumer performance metric 758.$t_0$ through 758.$t_k$ based upon a measured consumer power consumptions 760.$t_0$ through 760.$t_k$ and permitted consumer power consumptions 762.$t_0$ through 762.$t_k$. In the exemplary embodiment illustrated in FIG. 7, the measured consumer power consumptions 760.$t_0$ through 760.$t_k$ indicate power consumption of the consumer compute agent in performing a workload over the one or more intervals in time $t_0$ through $t_k$ and the permitted consumer power consumptions 762.$t_0$ through 762.$t_k$ represents the maximum power consumption allowed to the consumer compute agent to perform the workload over the one or more intervals in time $t_0$ through tr. As illustrated in FIG. 7, the consumer power consumption controllers 704.$t_0$ through 704.$t_k$ can provide the consumer performance metric 758.$t_0$ through 758.$t_k$ in response to comparing the measured consumer power consumptions 760.$t_0$ through 760.$t_k$ and the permitted consumer power consumptions 762.$t_0$ through 762.$t_k$. In the exemplary embodiment illustrated in FIG. 7, each consumer power consumption controllers from among the consumer power consumption controllers 704.$t_0$ through 704.$t_k$ operates in a substantially similar manner as the consumer power consumption controller 404 as described above and will not be described in further detail below.

Figure 8:
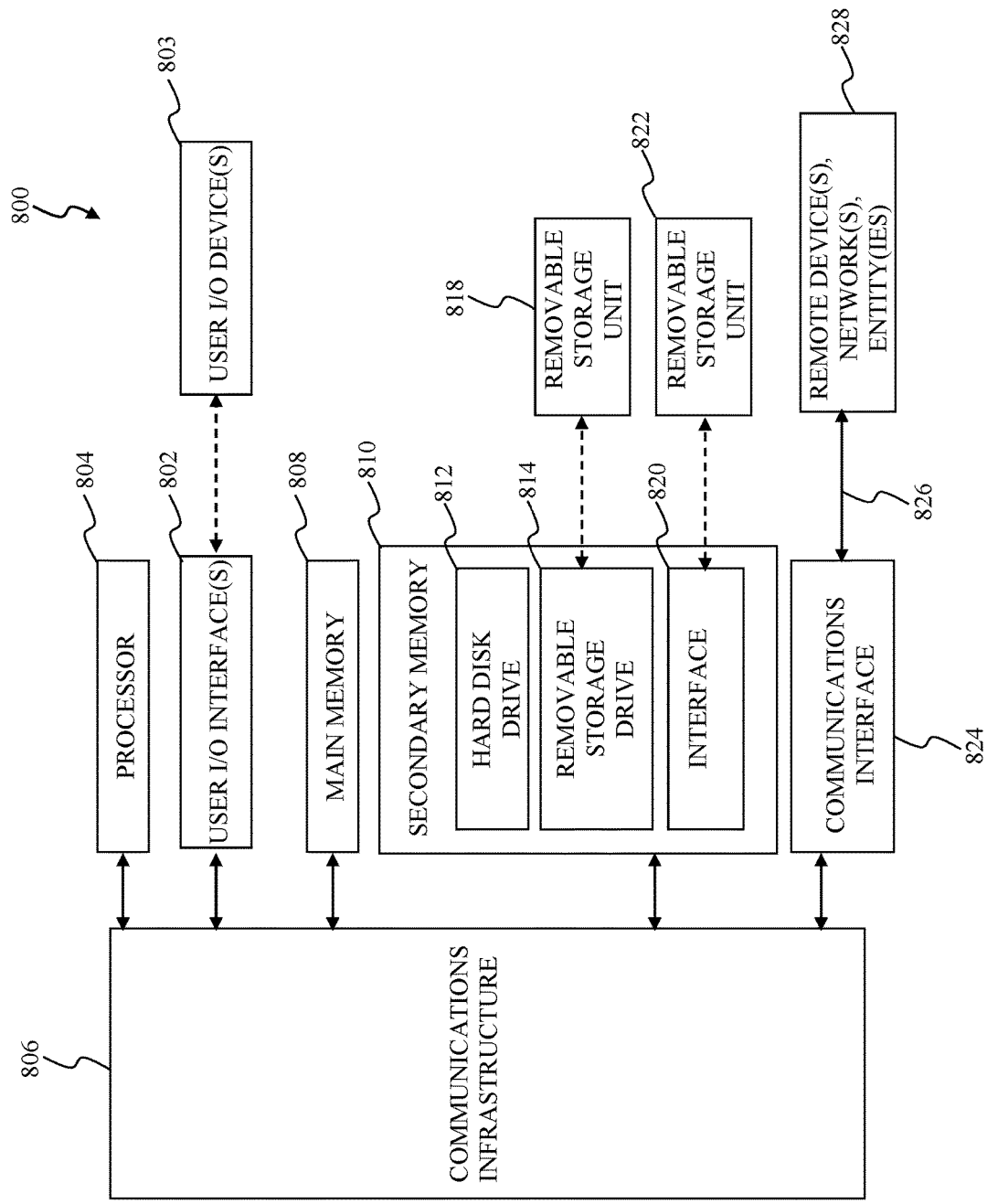
FIG. 8 illustrates a block diagram of an exemplary computer system that can be used to implement the first exemplary computing device or the second exemplary computing device in accordance with various embodiments of the present disclosure.

Exemplary Computer System that can be Used to Implement the First Exemplary Computing Device or the Second Exemplary Computing Device FIG. 8 illustrates a block diagram of an exemplary computer system that can be used to implement the first exemplary computing device or the second exemplary computing device in accordance with various embodiments of the present disclosure. Computer system 800 can be any well-known computer capable of performing the functions described herein such as the UE 102 and/or the AN 104 as described above. Computer system 800 includes one or more processors (also called central processing units, or CPUs), such as a processor 804. Processor 804 is connected to a communication infrastructure 806 (e.g., a bus). Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some aspects, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 8. In particular, aspects may operate with software, hardware, and/or operating system implementations other than those described herein.

CONCLUSION

Embodiments of the disclosure can be implemented in hardware, firmware, software application, or any combination thereof. Embodiments of the disclosure can also be implemented as instructions stored on one or more computer-readable mediums, which can be read and executed by one or more processors. A computer-readable medium can include any mechanism for storing or transmitting information in a form readable by a computer (e.g., a computing circuitry). For example, a computer-readable medium can include non-transitory computer-readable mediums such as read only memory (ROM); random access memory (RAM); magnetic disk storage media; optical storage media; flash memory devices; and others. As another example, the computer-readable medium can include transitory computer-readable medium such as electrical, optical, acoustical, or other forms of propagated signals (e.g., carrier waves, infrared signals, digital signals, etc.). Further, firmware, software application, routines, instructions have been described as executing certain actions. However, it should be appreciated that such descriptions are merely for convenience and that such actions in fact result from computing devices, processors, controllers, or other devices executing the firmware, software application, routines, instructions, etc.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately executed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan considering the teachings and guidance.

The breadth and scope of the disclosure should not be limited by any of the above-described exemplary embodiments but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method for distributing a system power budget among a plurality of compute agents of a computing device, the method comprising:

accessing, by a producer compute agent from among the plurality of compute agents, the system power budget, the system power budget being related to a temperature within the computing device;

accessing, by the producer compute agent, a plurality of performance metrics provided by a plurality of consumer compute agents from among the plurality of compute agents;

partitioning, by the producer compute agent, the system power budget among the plurality of compute agents in response to the plurality of performance metrics to provide a plurality of component power budgets, the partitioning comprising partitioning more of the system power budget to a power budget from among the plurality of component power budgets when a corresponding performance metric from among the plurality of performance metrics indicates that the producer compute agent is creating workloads faster than a corresponding consumer compute agent from among the plurality of consumer compute agents is capable of performing the workloads;

distributing, by the producer compute agent, the plurality of component power budgets among the plurality of compute agents to distribute the system power budget among the plurality of consumer compute agents; and configuring, by the producer compute agent, the plurality of compute agents such that a power consumption of each compute agent from among the plurality of compute agents does not exceed its component power budget from among the plurality of component power budgets.

2. The method of claim 1, further comprising receiving, by the producer compute agent, the system power budget from a system management controller that monitors a plurality of system component temperatures of the computing device.

3. The method of claim 1, wherein the plurality of performance metrics is based on energy consumption of the plurality of consumer compute agents.

4. The method of claim 1, wherein the partitioning comprises partitioning less of the system power budget to the power budget when the corresponding performance metric indicates that the producer compute agent is creating workloads slower than the corresponding consumer compute agent is capable of performing the workloads.

5. The method of claim 1, wherein the partitioning comprises:
  determining a plurality of dynamic power coefficients in which to partition the system power budget among the plurality of consumer compute agents;
  comparing a performance metric from among the plurality of performance metrics and a corresponding dynamic power coefficient from among the plurality of dynamic power coefficients to determine a power coefficient margin that is associated with the corresponding dynamic power coefficient; and
  adjusting the corresponding dynamic power coefficient to minimize the power coefficient margin.

6. The method of claim 5, wherein the adjusting comprises:
  increasing the corresponding dynamic power coefficient when the performance metric indicates a measured performance for a corresponding consumer compute agent from among the plurality of consumer compute agents is more than a permitted performance allowed by the producer compute agent; and
  decreasing the corresponding dynamic power coefficient when the performance metric indicates a measured performance for a corresponding consumer compute agent from among the plurality of consumer compute agents is less than a permitted performance allowed by the producer compute agent.

7. The method of claim 1, wherein the configuring, by the producer compute agent, comprises configuring operating voltages or operating frequencies of the plurality of compute agents.

8. A System on Chip (SoC), comprising:
  a plurality of consumer compute agents from among a plurality of compute agents configured to provide a plurality of performance metrics; and
  a producer compute agent from among the plurality of compute agents configured to:
    access a system power budget that is related to a temperature within a computing device including the SoC,
    partition the system power budget among the plurality of compute agents in response to the plurality of performance metrics to provide a plurality of component power budgets, the producer compute agent being configured to partition more of the system power budget to a power budget from among the plurality of component power budgets when a corresponding performance metric from among the plurality of performance metrics indicates that the producer compute agent is creating workloads faster than a corresponding consumer compute agent from among the plurality of consumer compute agents is capable of performing the workloads,
    distribute the plurality of component power budgets among the plurality of compute agents to distribute the system power budget among the plurality of compute agents, and
    configure the plurality of compute agents such that a power consumption of each compute agent from among the plurality of compute agents does not exceed its component power budget from among the plurality of component power budgets.

9. The SoC of claim 8, wherein the producer compute agent is further configured to receive the system power budget from a system management controller that monitors a plurality of system component temperatures of the computing device.

10. The SoC of claim 8, wherein the plurality of performance metrics is based on energy consumption of the plurality of consumer compute agents.

11. The SoC of claim 8, wherein the producer compute agent is configured to partition less of the system power budget to the power budget when the corresponding performance metric indicates that the producer compute agent is creating workloads slower than the corresponding consumer compute agent is capable of performing the workloads.

12. The SoC of claim 8, wherein the producer compute agent is configured to:
  determine a plurality of dynamic power coefficients in which to partition the system power budget among the plurality of consumer compute agents;
  compare a performance metric from among the plurality of performance metrics and a corresponding dynamic power coefficient from among the plurality of dynamic power coefficients to determine a power coefficient margin that is associated with the corresponding dynamic power coefficient; and
  adjust the corresponding dynamic power coefficient to minimize the power coefficient margin.

13. The SoC of claim 12, wherein the producer compute agent is configured to:
  increase the corresponding dynamic power coefficient when the performance metric indicates a measured performance for a corresponding consumer compute agent from among the plurality of consumer compute agents is more than a permitted performance allowed by the producer compute agent; and
  decrease the corresponding dynamic power coefficient when the performance metric indicates a measured performance for a corresponding consumer compute agent from among the plurality of consumer compute agents is less than a permitted performance allowed by the producer compute agent.

14. The SoC of claim 8, wherein the producer compute agent is configured to configure operating voltages or operating frequencies of the plurality of compute agents.

15. A computing device, comprising:
  a memory that stores a producer compute agent closed-loop performance controller (CLPC); and
  a producer compute agent configured to execute the producer CLPC, the producer CLPC, when executed by the producer compute agent, configuring the producer compute agent to:
    access a system power budget that is related to a temperature within the computing device,
    access a plurality of performance metrics provided by a plurality of consumer compute agents, partition the system power budget among the plurality of compute agents in response to the plurality of performance metrics to provide a plurality of component power budgets, the producer compute agent being configured to partition more of the system power budget to a power budget from among the plurality of component power budgets when a corresponding performance metric from among the plurality of performance metrics indicates that the producer compute agent is creating workloads faster than a corresponding consumer compute agent from among the plurality of consumer compute agents is capable of performing the workloads, distribute the plurality of component power budgets among the plurality of compute agents to distribute the system power budget among the plurality of compute agents, and configure the plurality of compute agents such that a power consumption of each compute agent from among the plurality of compute agents does not exceed its component power budget from among the plurality of component power budgets.

16. The computing device of claim 15, wherein the producer CLPC, when executed by the producer compute agent, configures the producer compute agent to receive the system power budget from a system management controller that monitors a plurality of system component temperatures of the computing device.

17. The computing device of claim 15, wherein the plurality of performance metrics is based on energy consumption of the plurality of consumer compute agents.

18. The computing device of claim 15, wherein the producer CLPC, when executed by the producer compute agent, configures the producer compute agent to partition less of the system power budget to the power budget when the corresponding performance metric indicates that the producer compute agent is creating workloads slower than the corresponding consumer compute agent is capable of performing the workloads.

19. The computing device of claim 15, wherein the producer CLPC, when executed by the producer compute agent, configures the producer compute agent to:

determine a plurality of dynamic power coefficients in which to partition the system power budget among the plurality of consumer compute agents;

compare a performance metric from among the plurality of performance metrics and a corresponding dynamic power coefficient from among the plurality of dynamic power coefficients to determine a power coefficient margin that is associated with the corresponding dynamic power coefficient; and adjust the corresponding dynamic power coefficient to minimize the power coefficient margin.

20. The computing device of claim 15, wherein the producer CLPC, when executed by the producer compute agent, configures the producer compute agent to configure operating voltages or operating frequencies of the plurality of compute agents.

* * * * *